United States Patent [19]
Hofmann et al.

[11] Patent Number: 5,930,734
[45] Date of Patent: Jul. 27, 1999

[54] METHOD AND APPARATUS FOR MEASURING THE THICKNESS OF NON-CIRCULAR ELONGATED WORKPIECES

[75] Inventors: Karsten Hofmann, Bleckede; Henning Steinfadt, Lüneburg, both of Germany

[73] Assignee: Lap GmbH Laser Applikationen, Luneburg, Germany

[21] Appl. No.: 08/963,924

[22] Filed: Nov. 4, 1997

[30] Foreign Application Priority Data

Nov. 18, 1996 [DE] Germany .......................... 196 47 613

[51] Int. Cl.⁶ .................................................. G01B 11/06
[52] U.S. Cl. .............................. 702/97; 702/94; 702/151; 364/538.28; 356/6; 356/387
[58] Field of Search .................................. 702/97, 94, 87, 702/170, 151; 356/387, 6; 364/528.38, 528.37

[56] References Cited

U.S. PATENT DOCUMENTS

| | | | |
|---|---|---|---|
| 3,870,890 | 3/1975 | Binks et al. .............................. | 356/378 |
| 4,432,648 | 2/1984 | Musto et al. ............................. | 356/387 |
| 5,383,022 | 1/1995 | Kaser ....................................... | 356/387 |
| 5,422,861 | 6/1995 | Stringer et al. .......................... | 702/97 |
| 5,539,675 | 7/1996 | Carroll, Sr. et al. ..................... | 702/170 |
| 5,768,154 | 6/1998 | Zelt, III et al. .......................... | 702/97 |
| 5,815,274 | 9/1998 | Dlugos .................................... | 702/170 |

FOREIGN PATENT DOCUMENTS

| | | |
|---|---|---|
| 0 266 525 | 11/1988 | European Pat. Off. . |
| 0 565 090 | 7/1993 | European Pat. Off. . |
| 3219389 | 11/1983 | Germany . |
| 39 16715 | 5/1990 | Germany . |

Primary Examiner—John Barlow
Assistant Examiner—Hien Vo
Attorney, Agent, or Firm—Vidas, Arrett & Steinkraus, P.A.

[57] ABSTRACT

The invention relates to a method for measuring the thickness of non-circular elongated workpieces in which the thickness of the workpiece is measured along three measuring axis, the measurements are fed into a computer to determine minimum and maximum values and associated angular positions of the measuring axis, the measuring systems are rotated to a zero measuring position and the measured thicknesses are correlated by an algorithm, and the computer computes the degree for which angular position of the mimimum and maximum changes when the workpiece is advanced.

11 Claims, 3 Drawing Sheets

METHOD AND APPARATUS FOR MEASURING THE THICKNESS OF NON-CIRCULAR ELONGATED WORKPIECES

BACKGROUND OF THE INVENTION

The invention relates to a method for measuring the thickness of non-circular elongated workpieces to be displaced in the direction of their elongation, said workpieces being in arbitrary and varying angular positions while they are being advanced.

It has become known to set the roll gap in rolling mills for flat products (heavy metal plates, hot metal plates) by means of a closed loop control system. To this end a measuring system is positioned behind the last roll stand, which measuring system continuously measures the thickness and, if desired, the eveness of the rolled product so as to provide an actual value for the control system which then sets the roll gap height and the roll gap geometry by means of respective actuators with a view to dimensional accuracy and flatness of the product.

It is desirable to use closed loop control systems also in mill trains for round products. Sofar this was not possible because measuring systems which are able to measure the true height and width of the rolled rod which may be twisted during advancement are not available.

It has become known to use oscillating or rotating singular axis measuring systems or double axes measuring systems of the adjustable angular position type in wire and rod rolling mills. The rotary measuring system is able to provide for diameter values measured at arbitrarily selected angular positions to be used as actual values. If, however, the true height position and the true width position of the rod differ from the initially defined angular positions due to twist of the product, incorrect measuring values will be obtained. Therefore, such a measuring method cannot be used in a closed loop control system.

Another prior art solution provides a pair of orthogonal measuring systems the angular positions of which may be adjusted simultaneously. Such a measuring system could be used for control if twist of the rolled product would be known and uniform. The prior art measuring system allows to determine the contour of the rolled product within an extremely short time. An operator then would be able to determine the position of the height and width axes of the rolled product by means of a diagram and to set the measuring head in this position. However, this would not allow to recognize whether there has been a change of the filling degree of the roll gap or a twist of the rolled product. If for example the twist angle would change while underfill would remain the same, the measured width would increase provided that the measuring system initially was in its optimal position. An increase of the measured width values, however, would result in an incorrect control of the total system. On the other hand, rotation of the rolled rod from an incorrect to a correct position would result in a measurement erroneously indicating a decrease in width.

A further prior art method uses a single axis measuring system adapted to be positioned under selectable angles, for example along the width of a twisted rod. In case of an increase of the measured values the measuring system performs minor forward and rearward search movements in order to determine whether the increase of the measured values results from a change of the filling degree or from a change of the twist angle. If the latter is true, the measuring system will be positioned under an angle where the diameter of the rod is a minimum. Such a measuring system is also not suited for a control because the measured actual value oscillates at the frequency of the search movement when there is a change of the twist angle.

SUMMARY OF THE INVENTION

It is a primary object of the invention to provide a method and an apparatus for measuring the thickness of non-circular elongated workpieces to be advanced in the direction of their elongation, which measuring system provides at a high measuring rate measured values which are not dependent on the twist angle, in particular such measuring system should be suited for the use in control systems.

In the method of the present invention thickness values of the workpiece are measured simultaneously along three measuring axes offset with respect to each other for small angles by means of three measuring systems which are rotated simultaneously about the axis of elongation of the workpiece within a predetermined angular range. This operation which may be called a search run allows for measurements of the thickness of the workpiece in an angular range of for example ±45°. The search run starts at a predetermined initial position and progresses initially in the one or the other direction of rotation. When the measuring systems are rotated for example for 90°, the central measuring system (main axis) can be used to determine the diameter of the workpiece and accordingly the contour of the workpiece within this range. The measured thickness values, for example those associated with the main axis, can be used by a computer to determine the amount and the angular position of a minimum thickness value or, respectively, a maximum thickness value. The measuring systems will then be rotated simultaneously to an angular position (zero position) whereat the thickness values measured by the central measuring system (i.e. the measured values for the main axis) are at a minimum or, respectively, at a maximum. When the workpiece, for example a rolled rod, is being advanced further, the diameter of the workpiece is measured by the measuring systems which are in their zero position. When for example the diameter measured along the main axis changes, this may be caused for example by a compensating step of the control loop such as an increase of the fill of the roll gap. Alternatively, a change of the measured values may be the result of a twist of the rolled rod with respect to a zero position. Without additional measures this phenomina cannot be discriminated. Therefore, according to the invention, a computer uses an algorithm to correlate the thickness values measured by the three measuring systems to each other. This allows to compute the degree for which the angular position of the true minimum or maximum of the measured thickness values has changed and in which direction of rotation such change has occured. Furthermore, this allows to determine the amount of the true minimum or maximum (capture range) wherein the true minimum or maximum of the measured thickness values move away from the zero position. The measured values of all three measuring systems have a predetermined relationship to each other which can be computed. Within this so-called capture range which may be for example +3° when the axes of the three measuring systems are offset with respect to each other to 5°, the true minimum or maximum of the thickness values can be computed without movements of the measuring systems. In this case the computed minimum or maximum provides the actual value for a control system. There are no definite mathematical relationships between the measured values outside of the capture range when the workpiece is of approximately circular cross-section and a subsidiary measuring system provides a uniform measured thickness value. Then it will be necessary to reposition the measuring systems. This is why in a preferred embodiment of the invention the measuring systems are rotated from said zero measuring position for a predetermined amount in the direction of change of the angular position of the minimum or, respectively, the maximum when said change exceeds a predetermined angle. This predetermined value may be for example half the width of the capture range, about 3° in the above-mentioned example.

The method of the invention allows to compute the change of the diameter values corresponding to the change of the angular positions of the minimum and maximum values. In this manner the contour of the workpiece within the angular range can be determined. This is important for example in connection with circular roll rods in order to be able to recognize offsetting of the rolls. When the rolls are offset, this will result in a pair of half shells offset with respect to each other in a cross-sectional view. In a similar manner wear of the rolls can be determined.

It has been mentioned already that the search run from an initial zero position in opposite directions of rotation will be performed for a predetermined angle in each direction. When the measured minimum or maximum will occur at a position offset with respect to the initial zero position, then the length of the total angular distance to the position of the measuring system at which the minimum or maximum of the measured values of the central measuring systems is in the center of the capture range (zero measuring position) will depend on the direction of rotation of the measuring system at the beginning of the search run. This is why a modification of the invention provides that the search run initially will be directed opposite to the direction in which the angular position of the minimum or maximum thickness values were displaced. This allows to optimize the duration of the search run so as to shorten the time necessary for the positioning step.

According to a further aspect of the invention additional measured values may be obtained by means of a fourth measuring system along a measuring axis which is perpendicular to the axis of the central measuring system (main axis). These further measured values will be related to the values measured along the main axis. This is desired for example when the dimensional accuracy of the path setting is to be examined.

It may and should occur during the measuring process that the measured values cannot be correlated anymore which means that the desired contour, for example a round contour, has been reached at least approximately. This is why in a modification of the invention another search run will be performed when the relationship of the measured values has remained substantially the same during a predetermined time. Such further search run ensures that there will be no faulty positioning.

For performing the method the invention provides three thickness measuring systems which are spaced along the direction of elongation of the workpiece and are offset with respect to each other for a small angle in a circumferential direction. The measuring systems are mounted on a common frame means which can be rotated about the axis of elongation of the workpiece. Furthermore an angle positioning drive for the frame means is provided. Any conventional measuring systems may be used for measuring the thickness. Preferred are measuring systems which use the shadow projection method or laser scan micrometers. Generally all prior art thickness measuring systems include an emitter and a receiver which are disposed diametrically opposite each other. The angle positioning drive is required to perform the search run and cause rotation to the angular position of the actual minimum or maximum of the values measured by the central measuring system (capture range). Furthermore the drive is used to reposition the measuring systems when the measured values are outside the above-mentioned capture range.

The angle between the main axis and subsidiary axes of the measuring systems is preferably 2 to 10°. Values outside this angular range generally cannot be used.

The method and apparatus of the present invention allow to determine in a simple manner the twist angle and its direction as well as the circular shape of a rod by measuring the increase of the diameter values in response to a change of the angle of rotation. As already mentioned the true minimum or maximum of the thickness may be computed for a predetermined angular range such that even though the minimum or maximum is not in the theoretically correct position valid measuring values may be obtained which can be used for example in a control of a roll stand. When the change of the angular position of the workpiece has a tendency for the angular position to leave the capture range, the total measuring assembly is repositioned in order to ensure that the width axis will remain within the angular range of the two subsidiary axis.

In particular in connection with the control of the rolling of rods an underfill or overfill may be controlled in a simple and safe manner, and roll offset or roll wear may be determined. Twist values for a number of workpieces can be stored in order to record a so-called twist history. Furthermore, the history allows to predict the twist value by computation when there is no mathematically usable contour. The total process of measuring the contour, mathematically exploiting the measured values and repositioning to the computed angular position may be performed in a minimal time, i.e. within 3 seconds at most.

BRIEF DESCRIPTION OF THE DRAWINGS

The invention will be explained with reference to drawings in more detail.

DETAILED DESCRIPTION OF THE INVENTION

The invention will be explained in connection with a roll gap control. It should be understood, however, that the invention is not limited thereto but may be used for control of the contour or thickness of any profiles.

Figure 5:
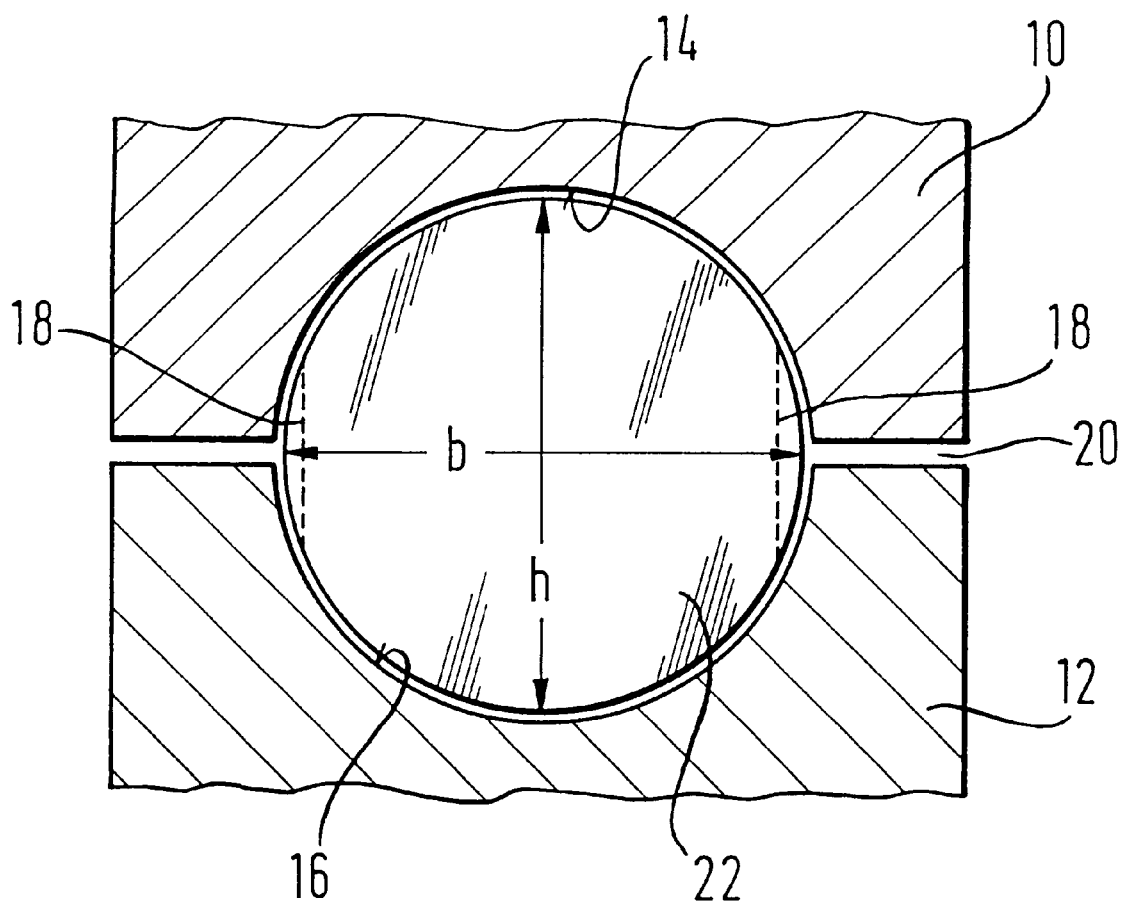
FIG. 5 is a cross-section through the roll gap or groove of a pair of rolls and the rolled rod.

FIG. 5 shows a pair of rolls 10, 12 of a roll stand for forming round profiles and indicated by semi-circular profiles 14 and 16, respectively, which together form a roll gap or roll groove of circular cross-sectional shape. It is desired to obtain the ideal circular cross-sectional shape of the rod which, however, is difficult to be realized. Either a so-called underfill will result, i.e. the circular cross-sectional area is not completely filled by material which is indicated by the dotted lines 18. Or there will be too much material between the rolls 10, 12, and the material will have the tendency to escape to the outside via the gap 20 between the rolls 10, 12. This condition is being called overfill. Ideally the width b of the rod designated by 22 and its height h should be of the same amount. Deviations from a round profile will result also when the semi-circular hollow profiled members 14, 16 wear and when the rolls 10, 12 are offset with respect to each other. A suitable measuring method should be able to sense the above-mentioned deviations and to remove them by control at the roll stand or, respectively, of the advance speed of the rod in order to obtain a profile as round as possible.

Figure 1:
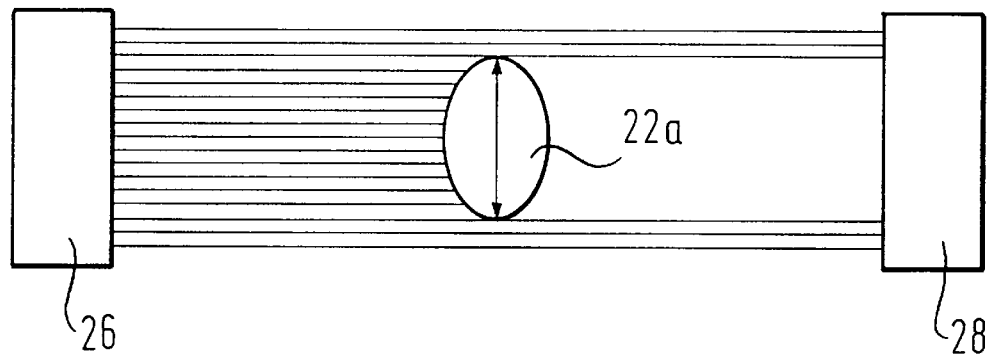
FIG. 1 shows schematically a thickness measuring system for a rod of an oval profile.

FIG. 1 shows a rolled rod 22a of a non-circular cross-section. The oval shape shown represents for example an underfill. A diameter or thickness measuring system comprising a transmitter 26 and a receiver 28 senses the thickness of the rod 22a which corresponds to the height h in FIG. 5. The thickness or diameter measuring system may operate using to the shadow projection method in that for example the transmitter 26 is a light source which projects parallel light beams onto the optical receiver 28 and the latter measures the length of the shadow which is generated by the rod 22a. Alternatively, a laser scan method may be used. Such apparatuses are well-known in the prior art.

Figure 2:
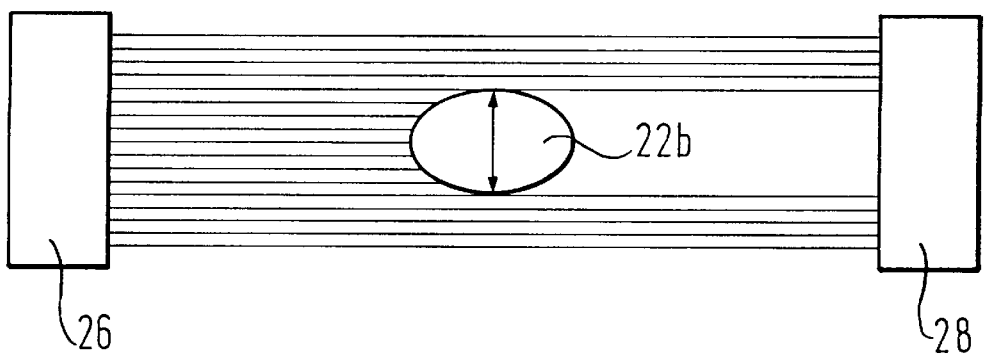
FIG. 2 shows the measuring system of FIG. 1 for an oval profile rotated for 90°.

FIG. 2 shows a rolled rod 22b the thickness of which is also measured by the measuring system shown in FIG. 1. FIG. 2 represents for example a condition of underfill.

Figure 3:
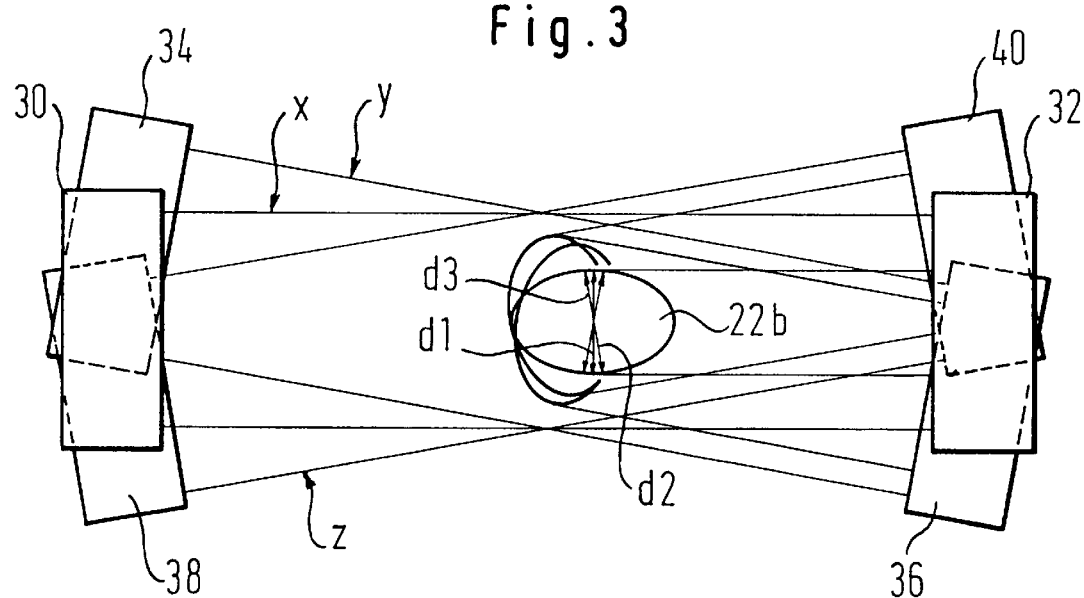
FIG. 3 shows schematically a measuring system of the invention.

FIG. 3 shows three measuring systems x, y and z each of which comprises a transmitter 30, 34, 38 and a receiver 32, 36, 40 corresponding to the measuring systems of FIG. 1 or FIG. 2. The central measuring system x performs measurements along a main axis which is perpendicular to the thickness d1 of the rod 22b. The subsidiary axes of the systems y, z are perpendicular to the thicknesses d2 and d3, respectively. The measuring systems x, y and z are offset with respect to each other in the direction of the axis of elongation of the rod 22b so that they do not interfere with each other. The measuring systems x, y, z are mounted to a common, not shown frame which can be rotated about an axis which coincides with the axis of elongation of the rod 22b. This frame is driven by a not shown angle positioning drive so as to rotate the assembly of the measuring systems x, y and z for predetermined angles which can be set relatively precisely.

From FIG. 3 it should be clear that each receiver 32, 36, 40 determines another measured thickness value of the rod 22a as represented by the thickness values d1 to d3. When the measuring systems x, y and z are rotated simultaneously, different thickness values depending on the angular positions of the measuring systems with respect to rod 22b will be obtained. This may be seen from the diagram in FIG. 4.

Figure 4:
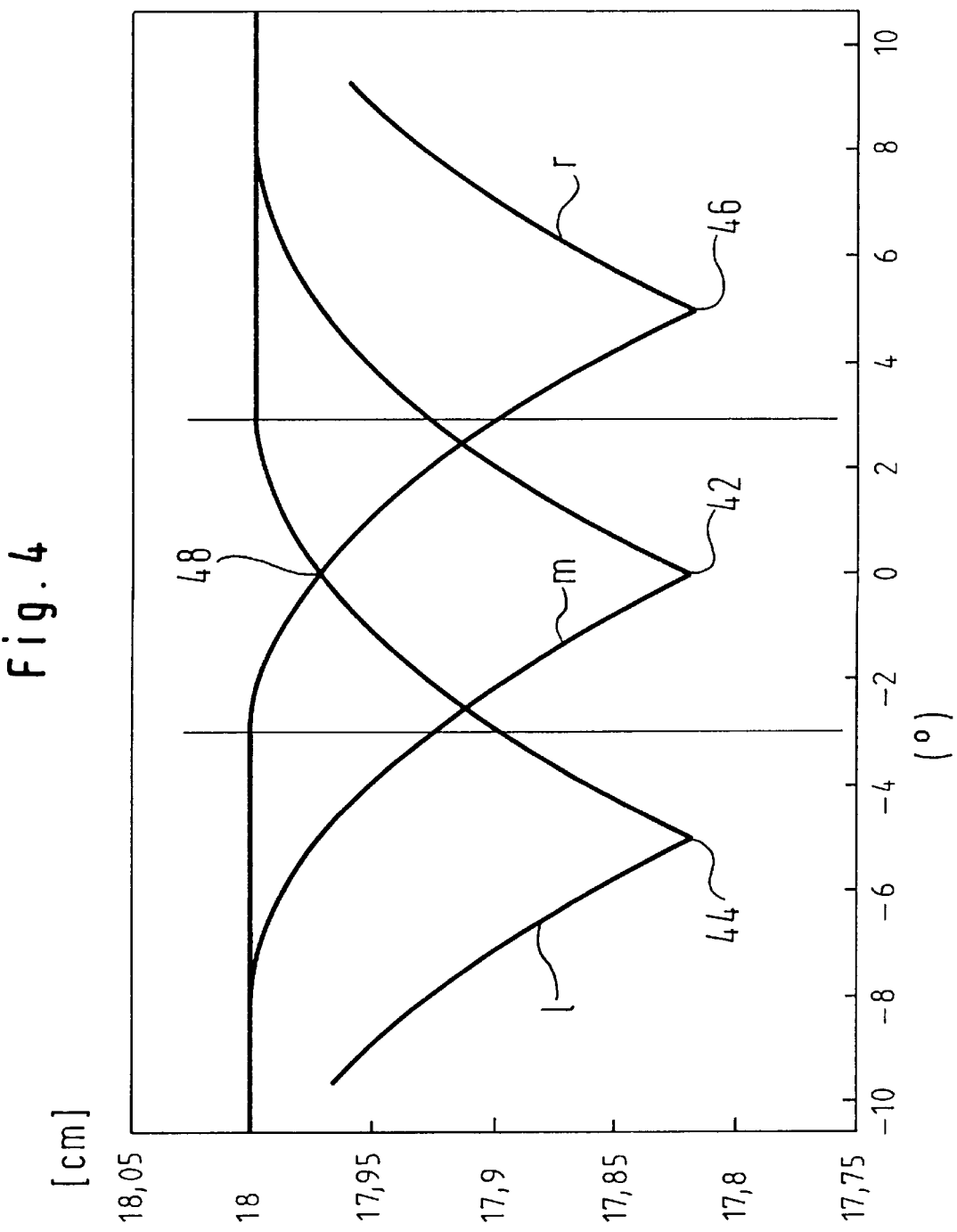
FIG. 4 shows a diagram to visualize the relationship between the values measured by the three measuring systems of FIG. 1 and the angular positions thereof.

The diagram of FIG. 4 includes curves of the values measured by the three measuring systems x, y and z which are obtained when they are rotated about an angle within a range in the present case from 0° to −10° and from 0° to +10°. The measured value curves m, l and r in FIG. 4 do not, however, represent the measured values obtained with respect to rod 22b but rather with respect to the rod 22a in FIG. 1, or when the rod 22b has been rotated for 90° or when the measuring systems x, y and z have been rotated for 90°. This can be concluded from the fact that a minimum thickness value as indicated at 42, 44 and 46 will be obtained in one angular position of the measuring systems x, y, z. This is the case for example when the main axis, i.e. the axis of the measuring system x, extends perpendicularly to the thickness axis b in FIG. 5 and when there is a condition of underfill. The desired ideal thickness value would be for example 18 cm in the case shown in FIG. 4. When a rod is of this thickness within an angular range, a constant thickness value will be obtained irrespective of the angle of rotation. Because the measuring systems x, y and z include an angle of for example between 2 and 10° with each other, with the subsidiary measuring systems y and z preferably being in symmetrical positions with respect to the main measuring system x, it should be clear that a minimum measured value will be obtained at different angles of rotation when the measuring system are rotated simultaneously. In the present case the angle at which the minimum measured value 42 has been measured is zero. Accordingly, the minimal measured values of the subsidiary measuring systems y and z are obtained at an angle of 5°.

At 0° the measuring systems x, y and z measure different thickness values, with the values measured by the measuring systems y and z being the same. At angles other than 0° three different measured thickness values will be obtained for each angle except for one case which is shown in FIG. 4 at 2,5 or, respectively, −2,5°. It was found that a certain mathematical relationship between the measured values at the different angles of rotation can be derived. If for example the measured value 42 and the measured value 44 at the intersection of curves l and r are known, respective mathematical relationships can be used to extrapolate the measured values so as to obtain measured values which would be obtained when the measuring systems x, y and z were rotated within a predetermined limited angular range. However, a definite mathematical relationship exists only within a limited angular range. As soon as the values measured by a measuring system do not change anymore, the mathematical relationships become indefinite. The range wherein the values measured by the measuring systems x, y, z can be correlated by a definite mathematical relationship has been designated capture range in FIG. 4.

The correlation of the values measured by the measuring systems x, y and z are of importance insofar as the thickness measured by the main measuring system may change when the measuring systems x, y and z are at a certain angular position, while it cannot be recognized whether such change is the result of an automatic or arbitrary change of the parameters of the roll stand or for example of a reduction of underfill or twist of the rod 22b. In the roll processes as described twist normally cannot be avoided. Twist is neither predictible nor constant and would result, unless corrected, in incorrect measured values which would make control of the roll stand impossible because a satisfactory control can be achieved only when the obtained actual values are true actual values.

When underfill will be reduced, the minimum thickness value 42 will be reduced, i.e. the value 42 will approximate come closer to the ideal thickness value 18 cm. However, this will not result in a substantial change of the measured values 44, 46. On the other hand when there will be twist of the workpiece, the minimum thickness value 42 again will approximate the ideal thickness value 18 cm, however, a substantial change of the measured values of measuring systems y, z will result as should be apparent from the curves in FIG. 4. When there will be twist of the workpiece in the amount of for example 1°, the measured values of the curves l and r are substantially different from each other: When the angle is −1°, the measured value of curve r exceeds that of curve l, and when the angle is +1°, the measured value of curve l exceeds that of of curve r. Therefore, this relationship of the measured values allows to determine the direction and amount of any twist of the workpiece by a respective algorithm in a computer which receives the values measured by the measuring systems x, y and z. When twist of the workpiece has reached a certain amount—which in the present case for example exceeds 3°—, it will be necessary to reposition the measuring systems x, y, z such that the minimum thickness value 42 again will be approximately in the middle of the capture range. The angle of pivotal movement of the measuring systems can be sensed. Such angle re-presents the twist angle of the rod 22b.

In a method for controlling calibration of rolled rods the measuring systems x, y, z will be directed for example such that—as mentioned—the main axis extends perpendicularly to the thickness b of the rolled rod; in case of an underfill this means that the minimum of the measured values will be substantially in the middle of the capture range as indicated in FIG. 4. When the profile of rolled rods is controled it is desired to obtain an underfill rather than an overfill. At the beginning of the measuring process it may occur, however, that the rod will be twisted such that the positioning as described above will not result in the ideal zero measuring position. Therefore, at the beginning a search run will be conducted wherein the measuring systems x, y and z are rotated for example from a zero angle to the left and to the right for an angle of for example 45°. This will result in measured thickness values corresponding to curves m, l and r in FIG. 4. Normally, however, the minimum thickness value 42 will not be in the middle of the capture range. In this case the measuring systems x, y, z will be rotated such that the minimum thickness value 42 (measuring system x) will be in the capture range.

The above described process allows to determine a plurality of parameters, namely to sense the total contour of the rod when it has been introduced into the roll mill. This allows to detect whether there is an offset of the rolls or wear of the rolls which would make it necessary to replace a roll. Furthermore, this allows to determine the twist angle. When the rod is being advanced further, a (not shown) control system will be used to minimize underfill and to have the contour of the rod approximate the circular shape. The measured thickness values and their relationship and change then allows to determine whether a change of the measured values of the main measuring system x was caused by the control system or by further twist of the rod.

The described process of measuring the contour including mathematical evaluation of the measured values and repositioning of the measuring systems x, y and z at the time when a new rod is being introduced takes 3 seconds at most. This process furthermore allows to optimize, i.e. to minimize the distance for which the measuring system has to be moved after the search run in order to reach the zero measuring position with respect to twist of the rod when it was known on which side of the initial zero measuring position the twist angle lies. Normally twist will not change from one rod to the following rod so much that it will be of a positive angle in the one case and of a negative angle in the other case. Therefore, the search run, i.e. rotation of the measuring systems x, y, z is initially performed such that the measuring systems x, y, z are rotated in a direction opposite to the (hypothetical) twist angle because in this case the measuring systems, after termination of the search run, will have to be moved for a smaller angle of rotation in order to reach the zero measuring position than in the opposite case.

As mentioned the roll process may and should result in a contour of the workpiece which eventually cannot be evaluated by means of the algorithm anymore, i.e. in a perfectly circular contour. In this case the measuring systems x, y and z will remain in their last position for a selectable duration. If within this duration no measurable underfill or overfill will occur, a further search run can be conducted in order to avoid any risk of incorrect positioning.

We claim:

1. A method for measuring the thickness of non-circular elongated work-pieces to be displaced in the direction of their elongation, which workpieces are in arbitrary and varying angular positions while they are being advanced, comprising the steps of:

simultaneously measuring thickness values of the workpiece along three measuring axes offset with respect to each other by small angles in a search run with three measuring systems which are rotated simultaneously about a longitudinal axis of the workpiece within a predetermined angular range;

determining minimal and maximum values of the measured thickness values and associated angular positions of the measuring axes;

rotating the measuring systems to a zero measuring position where-at the thickness values measured by a central measuring system of the three measuring systems are substantially at a minimum or, respectively, maximum;

correlating the thickness values measured by the three measuring systems at said zero measuring position to each other by an algorithm of a computer, and computing the degree for which the angular position of the minimum thickness value and the maximum thickness value changes when the workpiece is advanced further, and further computing the amount of the minimum or the maximum value of the changed angular position and the direction of the change of the angular position.

2. A method as defined in claim 1, characterized in that the measuring systems are rotated from said zero measuring position for a predetermined amount in the direction of change of the angular position of the minimum or, respectively, the maximum when said change exceeds a predetermined angle.

3. A method as defined in claim 1, wherein the algorithm is used to compute the change of the thickness values associated with the change of the angular positions of the minimum or maximum values.

4. A method as defined in claim 1, wherein said predetermind angular range of the search run is ±45° from an initial measuring position.

5. A method as defined in claim 1, wherein the search run for all workpieces following a first workpiece is directed opposite to the direction in which the angular position of the minimum value or maximum value was displaced.

6. A method as defined in claim 1, wherein a fourth measuring system is used to measure additional thickness values for the workpiece, with the measuring axis of said fourth measuring system extending perpendicularly to the axis of said central measuring system, and the measured values in the computer are correlated to the thickness values measured by the fourth measuring system.

7. A method as defined in claim 1, wherein another search run will be performed when the relationship of the measured values has remained substantially the same for a predetermined duration.

8. An apparatus for performing the method of claim 1, comprising:

three measuring systems for measuring thickness values of the workpieces, which measuring systems are spaced in the direction of elongation of the workpiece and have measuring axes offset with respect to each other in a circumferential direction for small angles;

common frame means for the measuring systems mounted so as to be rotatable about the axis of elongation of the workpiece; and positioning drive means for rotating said common frame means.

9. An apparatus as defined in claim 8, wherein said three measuring systems comprise a central measuring system having a main axis and a pair of outer measuring systems having subsidiary axes symmetrically arranged with respect to said main axis.

10. An apparatus as defined in claim 9, wherein the main axis includes an angle of about 2 to 10° with each of said subsidiary axes.

11. An apparatus as defined in claim 9, wherein said frame means carries a fourth measuring system having a measuring axis which is perpendicular to said main axis.

* * * * *